(12) United States Patent
Hebrard et al.

(10) Patent No.: US 11,248,650 B2
(45) Date of Patent: Feb. 15, 2022

(54) ROLLING BEARING CAGE

(71) Applicants: AKTIEBOLAGET SKF, Gothenburg (SE); SKF Aerospace France S.A.S, Montigny-le-Bretonneux (FR)

(72) Inventors: Yoann Hebrard, Sarras (FR); Defeng Lang, Delft (NL); Jeroen van Diermen, Lent (NL)

(73) Assignees: AKTIEBOLAGET SKF, Gothenburg (SE); SKF AEROSPACE FRANCE S.A.S, Montigny-le-Bretonneux (FR)

( * ) Notice: Subject to any disclaimer, the term of this patent is extended or adjusted under 35 U.S.C. 154(b) by 0 days.

(21) Appl. No.: 16/875,137

(22) Filed: May 15, 2020

(65) Prior Publication Data
US 2020/0370600 A1 Nov. 26, 2020

(30) Foreign Application Priority Data
May 24, 2019 (DE) .......................... 102019207643.2

(51) Int. Cl.
*F16C 33/46* (2006.01)
*F16C 41/00* (2006.01)
*F16C 19/52* (2006.01)

(52) U.S. Cl.
CPC .......... *F16C 19/52* (2013.01); *F16C 33/4623* (2013.01); *F16C 41/002* (2013.01); *F16C 2233/00* (2013.01)

(58) Field of Classification Search
CPC .... F16C 19/52; F16C 33/4623; F16C 41/002; F16C 41/008; F16C 2233/00
See application file for complete search history.

(56) References Cited

U.S. PATENT DOCUMENTS

| | | | |
|---|---|---|---|
| 9,512,882 B2* | 12/2016 | Wei | ..................... F16C 33/4623 |
| 9,989,097 B2 | 6/2018 | Hebrard et al. | |
| 2016/0108969 A1 | 4/2016 | Wei et al. | |
| 2017/0102036 A1 | 4/2017 | Hebrard et al. | |
| 2019/0310163 A1 | 10/2019 | Lang et al. | |

FOREIGN PATENT DOCUMENTS

| | | |
|---|---|---|
| DE | 102013207864 A1 | 10/2014 |
| DE | 102013218184 A1 | 3/2015 |
| DE | 102016218897 A1 | 3/2017 |
| EP | 1849013 B1 | 11/2011 |
| EP | 3553336 A1 | 10/2019 |
| GB | 2540564 A | 1/2017 |
| JP | H02190619 A | 7/1990 |

OTHER PUBLICATIONS

Richert, Florian, Introduction to electronic compontents: Active vs. passive components, Jan. 28, 2020.*
Search Report from the British Patent Office in application GB2002175.4 dispatched in Jun. 18, 2020.

* cited by examiner

*Primary Examiner* — James Pilkington
(74) *Attorney, Agent, or Firm* — J-Tek Law PLLC; Scott T. Wakeman; Mark A. Ussai

(57) ABSTRACT

A rolling bearing cage includes at least one cage side ring and a plurality of cage bars extending from the cage side ring so as to form a plurality of pockets, each pocket being defined between a separate pair of adjacent bars, for receiving rolling bodies of the rolling bearing. A cage breakage detection unit includes at least one conductive track and a module for wireless cage breakage monitoring. The cage has at least one recess, in which at least a prefabricated part of the cage breakage detection unit is inserted and fixed.

7 Claims, 2 Drawing Sheets

ROLLING BEARING CAGE

CROSS-REFERENCE

This application claims priority to German Patent Application No. 102019207643.2, filed May 24, 2019, the entire contents of which are fully incorporated herein by reference.

BACKGROUND OF THE INVENTION

The present invention relates to rolling bearings, and more particularly to cages for retaining rolling bodies of such bearings.

DE 10 2016 218 897 A1 discloses a bearing cage including a cage main body made of a polymer material and having pockets for receiving at least one row of rolling elements of a bearing. The cage is provided with a passive resonant circuit including an antenna coil attached to the cage main body. The antenna coil is formed as a conductive layer directly attached to the cage material of the cage main body and is designed so to have a breaking point less than or equal to a breaking point of the cage material. Thereby, a rupture in the cage main body ruptures the antenna coil, changing the resonance behavior of the passive resonant circuit.

SUMMARY OF THE INVENTION

In the present invention, a conductive track is embedded to a shallow depth that represents an unacceptable amount of cage wear, and is preferably embedded in a wear surface of the cage which, in operational use, is in moving contact with a further surface of a bearing that comprises the cage. Cage failure due to such wear is thereby detectable.

In other embodiments, the conductive track is attached to a surface or located within a groove not completely surrounded by material of the cage. The area of embedment or attachment does not need to be in contact with another surface of the cage.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
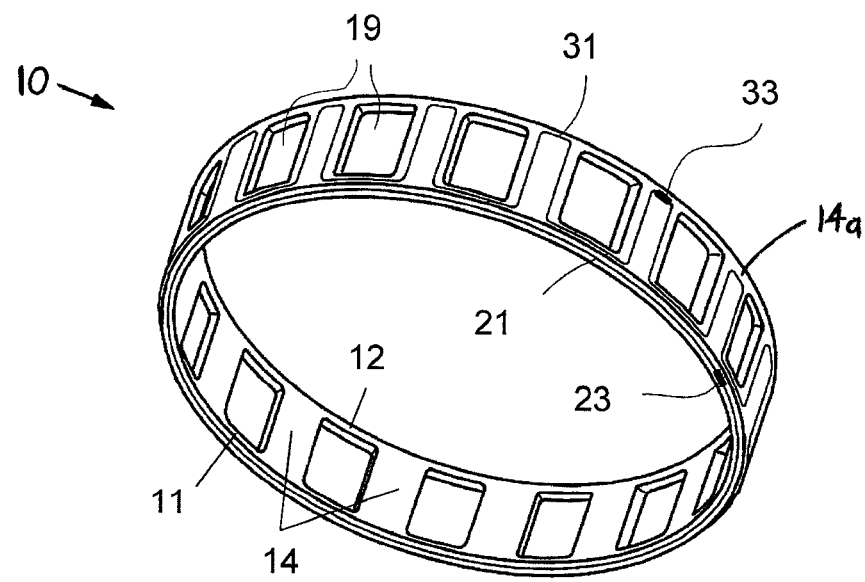
FIG. 1 is a perspective view of a bearing cage including a breakage monitoring unit in accordance with the present invention.

FIG. 1 schematically depicts a cylindrical roller bearing cage 10 as an exemplary embodiment of the present invention. The depicted cage 10 has a plurality of pockets 19 for receiving cylindrical rollers of a cylindrical roller bearing. The cage 10 has a base cage structure comprising a first cage side ring 11 and a second cage side ring 12, which are connected by a number of cage bars 14. Specifically, the number of cage bars 14 correspond to the number of pockets 19 and each pocket 19 is defined between each pair of adjacent bars 14. However, the bearing cage 10 may alternatively have a base cage structure that includes only a single cage side ring 11 and the plurality of bars 14 extending from the single cage side ring 11.

The bearing cage 10 further comprises a first conductive track 21 in or on an area of the outer, free side face 11a of the first cage side ring 11. Preferably, the cage 10 also has a second conductive track 31 in or on an area of the outer "jacket" or outer circumferential surface of the cage 10, preferably extending about three sides of each pocket 19. The two conductive tracks 21, 31 form two separate loops in this embodiment, and each has its own module 23, 33, respectively, for wireless monitoring of breakage of the cage. The modules 23 and 33 comprise passive and/or active electric components as disclosed in German Patent Application No. DE 102016218897A1 filed on Sep. 29, 2016, the entire contents of which are incorporated by reference herein, and European Patent Application No. 18166481.4 (published as EP 3553336 A1) filed on Oct. 4, 2018, the entire contents of which are incorporated by reference herein, each of the two incorporated documents having the same applicant as the present application.

For example, each module 23, 33 may include elements of an LC circuit, such as an inductor and a capacitor, configured such that each conductive track 21 or 31 will resonate while the tracks 21, 31 remain unbroken, the resonance or lack of resonance being detectable by an appropriate detecting device (e.g., a reception coil and processing unit). However, the modules 23, 33 may be fabricated and configured in any other appropriate manner that enables detection of a breakage in the conductive tracks 21, 31.

In certain embodiments, the cage 10 may be provided solely with the first conductive track 21, i.e., without the second conductive track 31. In particular, the cage 10 may be formed as a tapered roller bearing cage having a diametrically larger cage side ring 11 and a diametrically smaller cage side ring 12. In such cage structures, the use of the first conductive track 21 on the larger diameter cage side ring 11 is particularly beneficial due to the tendency of the larger diameter side ring to fail first.

Figure 2:
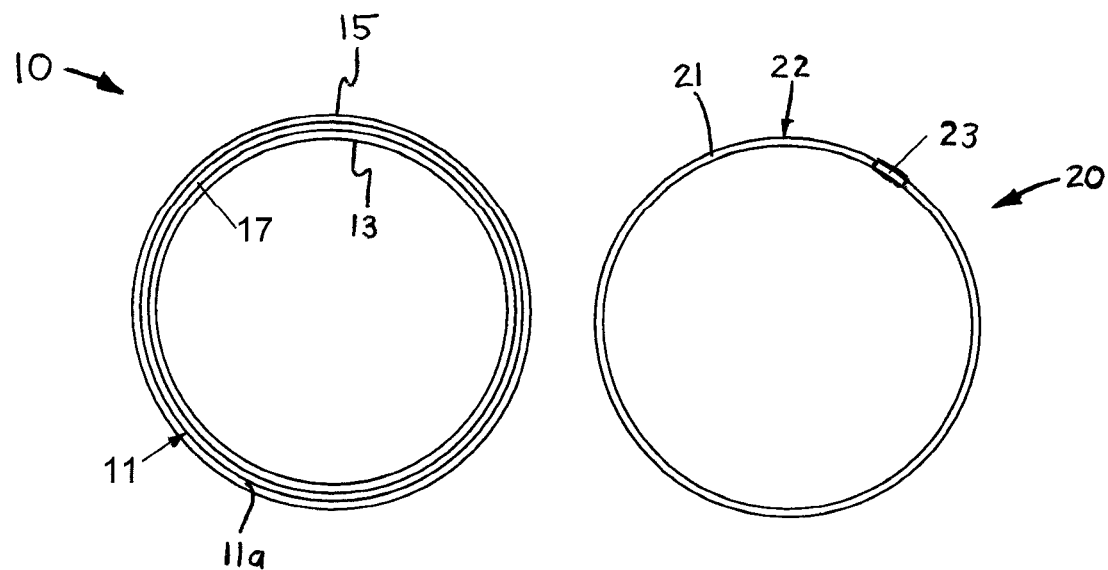
FIG. 2 is a side view of the bearing unit showing a groove in a cage side ring and the breakage monitoring unit shown separate from the groove.
Figure 3:
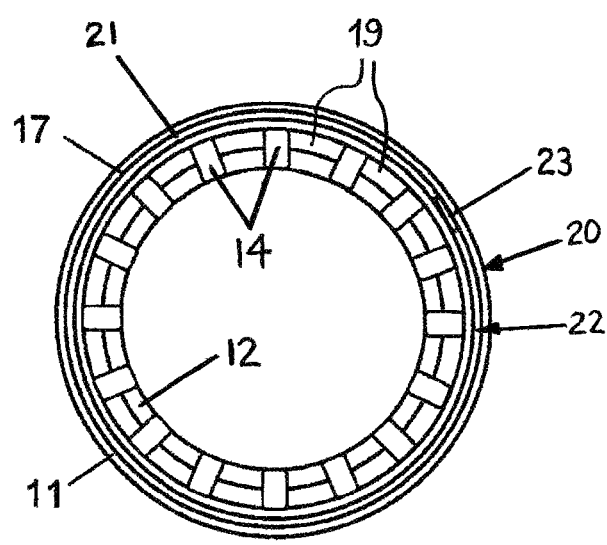
FIG. 3 is a side plan view of a bearing cage including the breakage monitoring unit, the cage being formed for tapered roller bearings.

FIG. 2 shows in greater detail the structure of the first conductive track 21 and the associated module 23 and the manner in which the track 21 and module 23 are connected with the first cage side ring 11. Specifically, a ring-shaped or annular circular groove 17 extends into the free side face 11a of the first cage side ring 11 and preferably has a semi-circular cross-sectional shape. A prefabricated cage breakage detection unit 20 is preferably of one-piece construction and is preferably retained within the groove 17 by means of an adhesive (e.g., glue). By using an adhesive such as glue to retain the cage breakage detection unit 20, the unit 20 is preferably connected with all surfaces defining the groove 17, which ensures that a breakage of the cage side ring 11 or 12 leads to a corresponding break or fracturing of the unit 20. That is, the unit 20 is fixed within the groove 17 such that any breakage of portions of the cage 10 adjacent to the groove 17 causes a breakage of the cage breakage detection unit 20. Further, the prefabricated cage breakage detection unit 20 is circular or ring-shaped with a cross-section correspondingly similar to the cross-sectional shape of the groove 17.

The cage breakage detection unit 20 basically comprises the first conductive track 21 and the module 23. The cage breakage detection unit 20 preferably further comprises a carrier 22 formed of a material having at least similar "breakage properties" as the material of the first cage side ring 11, and preferably of the entire cage 10. As used herein, the term "breakage properties" is intended to mean or encompass any one or more of the material properties relating to breaking, fracturing, cracking, shearing, splintering, etc. of the material of the cage 10 and the carrier 22, such as but not limited to, tensile strength, flexural strength, fracture toughness, etc. Preferably, the conductive track 21 and the module 23 are attached to or embedded within the carrier 22.

Further, the groove 17 and the cage breakage detection unit 20 are designed or sized such that neither the cage side ring 11 nor the unit 20 project outwardly from the other, i.e., are at least generally flush. In other words, the cage breakage detection unit 20 has a thickness about equal to the depth of the groove 17, such that an outer face (not indicated) of the unit 20 is flush with the side face 11*a* of the cage side ring 11.

In other embodiments, the groove 17 and the unit 20 may have any other appropriate cross-sectional shape (i.e., besides semicircular), such as for example, semi-elliptical, v-shaped, rectangular, etc. Further, the groove 17 may be formed as an open step extending inwardly from the outer or inner circumferential surface of the cage side ring 11. In other embodiments, the unit 20 may project over the cage 10 or the cage 10 may project over the unit 20.

Further, in other embodiments, the unit 20 can be fixed within the groove 17 by means of other bonding or joining technologies, such as molding, over-molding and the like, by means of positive-locking, e.g. clipping, and/or other mechanical fixation means such as rivets, screws, etc., and may provide a removable connection of the unit 20 for purposes of repair or replacement. However, when using any means for fixation or connection of the cage breakage detection unit 20 within the groove 17, it must be ensured that any breakage of the cage side ring 11 leads to a corresponding breakage of the unit 20. Such a concern also applies to the selection of materials for the cage base structure, which must have breakage properties correlating to the breakage properties of the material of the carrier 22 of the cage breakage detection unit 20, as well as the materials of the entire detection unit 20.

As such, the cage side ring 11, the entire bearing cage 10 and/or the carrier material may be polyamide, another polymer material or other suitable synthetic materials, or comprises one or more of these materials with additives such as reinforcing fibers, e.g. glass and/or carbon fibers, to match required mechanical properties of the cage 10 and/or the carrier 22. The polymer material may comprise polyamide, phenolic resin, polyether ether ketone (PEEK), polyetherketoneketone (PEKK) or another suitable polymer. Further, the cage base structure is preferably of a one-piece construction and generally uniform in material composition.

The conductive track 21 may be directly attached to the material of the carrier 22 and is designed to have a breaking point or fracture point equal to or less than a breaking point of the carrier material. As used herein, the term "breaking point" means the loading, force, torque, fatigue limit or other failure event causing a breakage, rupture, cracking, fracture, etc. of the cage 10, any portion of the cage 10, the conductive tracks 21, 31 and/or the carrier 22. The conductive track 21 is designed such that a rupture or fracture at any relevant section of the carrier 22 completely interrupts the conductive track 21 connection at the point of the crack so that the conductive track loop is opened. This may be achieved by using a thin conductive layer as the conductive track 21.

At the same time, the adhesion of the conductive track 21 to the surface of the carrier 22 must be sufficiently strong to ensure that the conductive track layer ruptures rather than peels off when the strain is too large. This specific relation between the rupturing strength of the carrier 22 and the conductive track layer 21 may be achieved in embodiments where the conductive track 21 is printed onto the carrier 22 or where the conductive track 21 is formed as a plating on the carrier 22.

Further, the conductive track 21 may be disposed on the surface of the carrier 22, partially on the surface of the carrier 22, partially embedded within, or fully embedded within the carrier 22. As an alternative to printing, the conductive track 21 may be formed as a relatively thin and fragile metal sheet formed by plating, painting, coating, etc. The conductive track 21 may also be formed by etching. Further, a protective coating layer may be added, e.g. by over-molding of the conductive track 21.

The cage breakage detection unit 20 is preferably a one-piece element or component. However, in other embodiments, the detection unit 20 may instead of a multi-piece design in which two or more parts are connected together by any appropriate means, e.g., by plugging, etc. Such a design may be required when the second track 31 is constructed in a similar manner as described above for the first conductive track 21 and/or if the first conductive track 21 is formed for installation in a groove (not depicted) on the inner circumferential surface 13 or the outer circumferential surface 15 of the cage side ring 11.

Further, the groove 17 may be formed as a meandering groove extending into the inner circumferential surface or the outer circumferential surface of the cage base structure, with the groove 17 extending along the cage bars 14 and along arch-shaped sections 14*a* between each pair of adjacent cage bars 14. More generally, the structure and properties of the conductive track 21, as well as the entire cage breakage detection unit 20, may be applied to or utilized in the construction or fabrication of the second conductive track 31 and the module 33.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A cage for a rolling bearing, the bearing having a plurality of rolling bodies, the cage comprising:
   a cage base structure including at least one cage side ring having a side face and an annular groove formed in the side face, a plurality of cage bars extending from the side ring such that a separate one of a plurality of pockets is defined between each pair of two adjacent bars, each pocket being configured to receive a rolling body of the bearing; and
   a cage breakage detection unit disposed within the annular groove and including an annular carrier, a conductive track and a module for wireless cage breakage monitoring, the track and the module being distinct from the annular carrier, disposed on or embedded within the carrier when separate from the cage and then installed within the groove as a unit.

2. The rolling bearing cage according to claim 1, wherein at least one of the conductive track and the module is attached to or embedded within the carrier by at least one of gluing, molding, over-molding and printing.

3. The rolling bearing cage according to claim 1, wherein the conductive track is configured to have a breaking point lower than a breaking point of at least one of the cage base structure and the carrier.

4. The rolling bearing cage according to claim 1, wherein the conductive track is formed as a loop and the module includes at least one of passive electric components and active electric components.

5. The rolling bearing cage according to claim 1, wherein the breakage detection unit is fixed within the annular groove by at least one of gluing, molding, over-molding and mechanical fastening.

6. The rolling bearing cage according to claim 1, wherein the cage breakage detection unit is fixed within the annular groove such that any breakage of the cage adjacent to the annular groove causes a breakage of the cage breakage detection unit.

7. The rolling bearing cage according to claim 1, wherein the breakage detection unit and the annular groove are each sized such that the cage breakage detection unit is at least generally flush with the free side face of the cage ring.

* * * * *